No. 849,748. PATENTED APR. 9, 1907.
P. PAULSEN.
VALVE FOR ENGINES.
APPLICATION FILED JAN. 2, 1906.
2 SHEETS—SHEET 1.
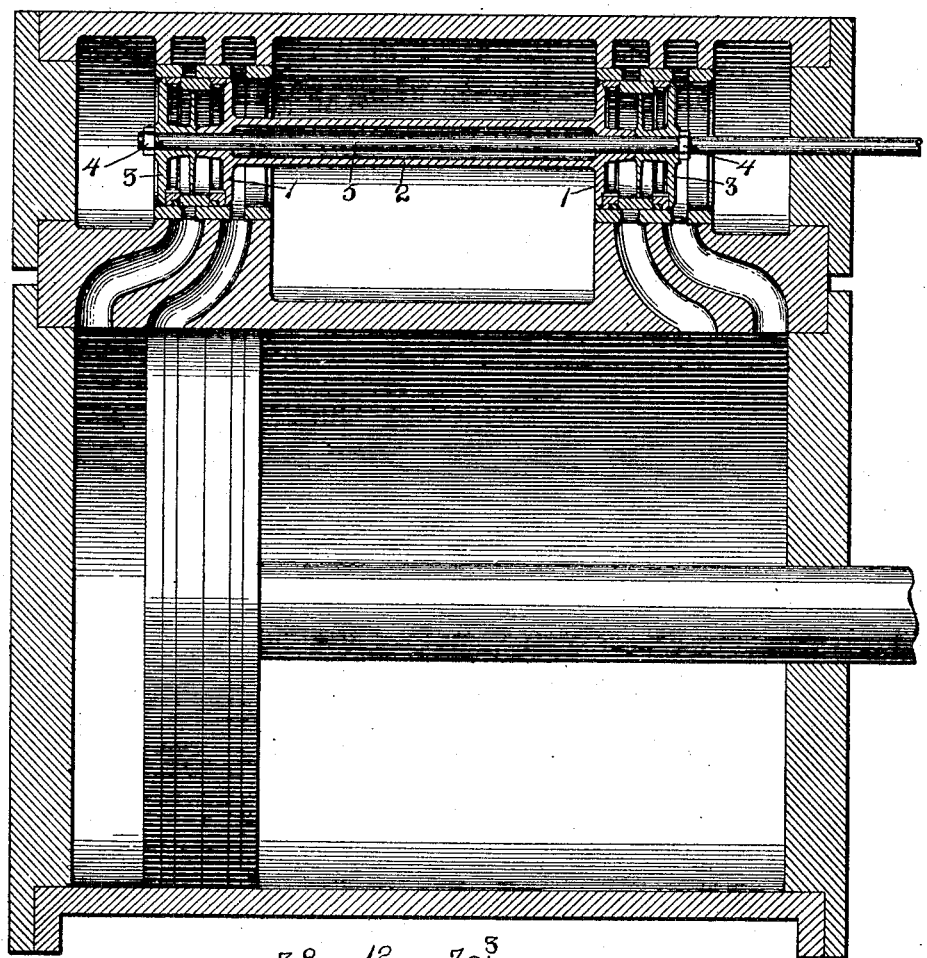
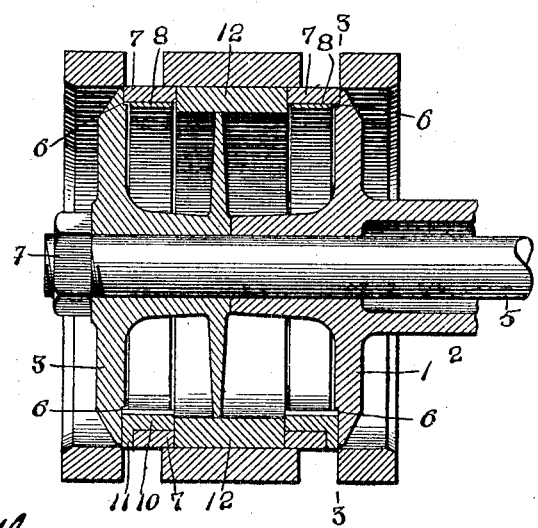
WITNESSES:
INVENTOR No. 849,748. PATENTED APR. 9, 1907.
P. PAULSEN.
VALVE FOR ENGINES.
APPLICATION FILED JAN. 2, 1906.

2 SHEETS—SHEET 2.

WITNESSES:
W. Burgess
Herbert Bradley.

INVENTOR
Peder Paulsen,
by Christy & Christy Atty's

UNITED STATES PATENT OFFICE.

PEDER PAULSEN, OF PITTSBURG, PENNSYLVANIA, ASSIGNOR TO EPPING-CARPENTER COMPANY, OF PITTSBURG, PENNSYLVANIA, A CORPORATION.

VALVE FOR ENGINES.

No. 849,748.      Specification of Letters Patent.      Patented April 9, 1907.

Application filed January 2, 1906. Serial No. 294,285.

*To all whom it may concern:*

Be it known that I, PEDER PAULSEN, residing at Pittsburg, in the county of Allegheny and State of Pennsylvania, a citizen of Norway, have invented or discovered certain new and useful Improvements in Valves for Engines, of which improvements the following is a specification.

The invention described herein relates to certain improvements in valves of the piston type, and consists, generally stated, in a construction wherein a connecting-stem, preferably hollow, is provided with heads at its ends combined with end heads, an intermediate supporting-disk, solid and spring rings secured between the heads.

The invention is hereinafter more fully described and claimed.

Figure 3:
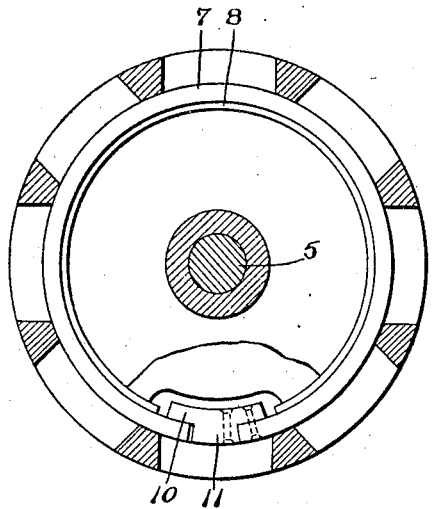
Figure 4:
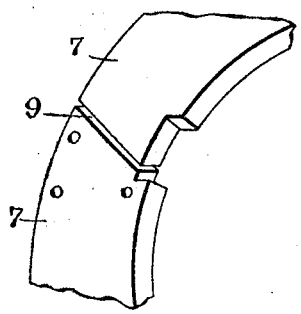
Figure 5:
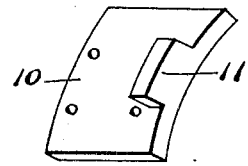
Figure 6:
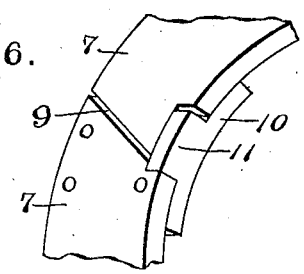

In the accompanying drawings, forming a part of this specification, Figure 1 is a sectional elevation of a cylinder of an engine having my improved valve applied thereto. Fig. 2 is a sectional view, on an enlarged scale, of one end of the valve, the ports in the valve-chamber being indicated. Fig. 3 is a section on a plane indicated by the line III III, Fig. 2, a portion of the intermediate supporting-disk being broken away. Figs. 4 and 5 are perspective detail views of parts of the spring-ring, and Fig. 6 is a similar view showing the parts illustrated in Figs. 4 and 5 arranged together.

In the practice of my invention the valve consists of two similar parts or members, one for each end of the valve-chamber, connected together so as to move in unison. Each part or member has inner heads 1 of a diameter slightly less than the diameter of the valve-chamber and connected by a stem 2, preferably tubular, as shown. Outer or end heads 3 are secured in operative relation to the inner heads 1, preferably by means of nuts 4 on the valve-rod 5, which extends through the heads and stem 2. These heads are provided on their inner faces with shoulders 6 for supporting the packing-rings 7. While these rings may be so constructed of a resilient material that their tendency to expand will cause them to have a sufficiently firm bearing against the walls of the valve-chamber, it is preferred to employ a spring 8 for that purpose. The slits or spaces 9 between the ends of the rings are covered by plates 10, secured by rivets or otherwise to one end of the springs and provided with lugs 11, projecting into recesses in the outer edges of the rings and covering the ends of the slits.

Solid or unsplit rings 12 are arranged between the split rings 7 and are internally supported by disks, which are preferably formed integral with the hubs of one or the other of the heads 1 or 3, more conveniently with the hubs of the outer heads 3, as shown. These rings are made to a sliding fit and being solid will not yield under pressure, and therefore are very efficient in checking momentum of the steam-pistons when cushioning. The rings 7 are made of a width somewhat greater than that of the ports, so that some portion of the rings will have a bearing on the inner wall of the valve-chamber and cannot expand and cut such walls.

I claim herein as my invention—

1. A valve for engines having in combination two separable heads, split rings having their outer edges supported by the heads, a solid ring arranged between the split rings and means intermediate of and substantially parallel with the heads for supporting the solid ring concentric with the heads, and means for securing the heads together and thereby forcing the split rings against the solid ring to hold the latter as against lateral movement.

2. A valve for engines having in combination two separable heads, split rings having their outer edges supported by the heads, a solid ring arranged between the split rings, a disk intermediate of the heads and carried by one of the heads for supporting the solid ring, and means for securing the heads together.

3. A valve for engines having in combination a body portion consisting of two heads and a connecting-stem, heads separable from the body portion, split rings supported by each of the heads, solid rings arranged between each pair of split rings, disks carried by one of the heads of each pair for supporting the solid ring, and means for drawing the outer heads toward the inner heads to clamp the several rings.

In testimony whereof I have hereunto set my hand.

PEDER PAULSEN.

Witnesses:
     CHARLES BARNETT,
     HERBERT BRADLEY.